Patented Sept. 7, 1948

2,448,572

UNITED STATES PATENT OFFICE 2,448,572

COMPOSITION COMPRISING AN ACYL PEROXIDE CURED POLYESTER AND AN ALKALINE CARBONATE

Burnard S. Biggs, Summit, N. J., assignor to Bell Telephone Laboratories, Incorporated, New York, N. Y., a corporation of New York No Drawing. Application April 30, 1943, Serial No. 485,162

10 Claims. (Cl. 260—40)

This invention relates to cured polyester synthetic rubber compounds or rigid crystalline compounds which contain pigments or other substances which increase the life of these compounds and in some cases impart to those compounds which are rubber-like a tensile strength which is outstanding as compared to the tensile strengths imparted by other pigments.

A new class of synthetic rubbers has recently been developed which is manufactured by curing plastic or thermoplastic polyesters of high molecular weight with benzoyl peroxide or other substances having a similar action. The curing is accomplished by intimately mixing the uncured polyester with the curing agent and heating the mixture to a curing or vulcanizing temperature.

The amount of benzoyl peroxide or other acyl peroxide required for curing varies from about .5 per cent by weight or less, for polyesters containing a substantial proportion of olefinic bonds and no inactivating substances, to about 25 per cent, for fully saturated polyesters heavily loaded with channel carbon black. These polymers cured with large amounts of peroxide, particularly those cured with more than about 5 per cent peroxide, deteriorate much more rapidly in tensile strength and modulus than those cured with smaller amounts, particularly when exposed to moisture and elevated temperatures.

According to the present invention, the life of the cured polyesters described above is increased by intimately incorporating in the polyester finely divided, substantially neutral solid substances having an alkaline buffering action, particularly alkaline carbonates. Of the alkaline carbonates, those which are insoluble in water, which are obtainable in finely divided form and which are good reinforcing pigments for the rubber, as well as stabilizing agents, are the most desirable.

Thus, although sodium bicarbonate and the alkaline earth carbonates, including magnesium carbonate, are suitable for increasing the life of the cured polyesters, the best results are obtained, particularly with rubber-like polymers, by using the finely divided calcium carbonates. The most desirable buffering pigment is an ultra-fine precipitated calcium carbonate having a particle size of the order of .03 micron or less. A pigment of this type is sold commercially under the tradename of "Kalvan."

Not only does this ultra-fine calcium carbonate provide a cured product which is more stable, but it also imparts to the cured rubbers a tensile strength which is approached by no other reinforcing pigment yet tested, except one, which does not have an undesirable effect on the life of the polyester. The only other pigment yet found which has an equivalent reinforcing power and no deleterious effect on the stability of the polymer is an extremely pure red oxide of iron sold under the name of "Mapico 297."

The remarkable reinforcing action of this ultrafine calcium carbonate is illustrated by the fact that a polyester made up of 50 mol per cent. ethylene glycol, 50 mol per cent isopropylene glycol, 97 mol per cent succinic acid and 3 mol per cent maleic acid, which when cured with 1.5 per cent benzoyl peroxide in the absence of any pigment had a tensile strength not substantially greater than 100 pounds per square inch, had a tensile strength of 2500 pounds per square inch when compounded with 75 per cent by weight of Kalvan prior to curing. The same polyester, when compounded with an equivalent amount of Atomite (a coarser calcium carbonate having a particle size of between 1 and 2 microns) and cured, had a tensile strength of only about 1200 pounds per square inch.

The peroxide cured polyester rubbers to which the present invention is applicable are described and claimed in the copending application of C. S. Fuller, Serial No. 485,202, filed on the same day as the present application. The uncured polyester gums, from which the cured rubbers are derived, may be strictly linear polyesters of high molecular weight containing no non-benzenoid carbon-to-carbon unsaturation, which are prepared by the superesterification of a glycol with a dicarboxylic acid, or of a hydroxy acid with itself, in a manner similar, for instance, to that described for crystalline polyesters in U. S. Patents 2,071,250 and 2,249,950.

Polyesters which are essentially similar but which contain limited amounts of olefinic or non-benzenoid unsaturation may also be cured to form synthetic rubbers to which the present invention is applicable. These partially unsaturated polyesters may be prepared in the same manner as the fully saturated polyesters except that one or more of the ingredients of the reaction mixture from which they are prepared contains a properly limited amount of unsaturated carbon-to-carbon bond.

The polyester gums, used for forming cured substances which have rubber-like properties at room temperatures, are extremely viscous liquids, which at room temperatures have a consistency somewhat similar to that of milled crepe rubber, or else they are somewhat flexible rubbery solids of slight crystallinity which melt readily at temperatures up to about 20° C. above room temperature to form viscous liquids of a consistency similar to the normally liquid polyesters. These latter substances possess sufficient flexibility, being largely amorphous, to be milled directly on cold rolls, where they are almost instantly reduced to a viscous liquid state by the temperature rise induced by milling.

The more highly crystalline polyesters, when cured, form hard, rigid substances. However, since these cured, highly crystalline polyesters lose their rigidity above their crystalline melting points and become rubber-like in their properties, the present invention is also of advantage in pigmenting these substances if they are to be used as rubbers at elevated temperatures. The stabilizing action obtained by the present invention is effective with the cured crystalline polyester regardless of whether they are used at the low temperatures at which they are rigid or at elevated temperatures at which they possess high reversible elasticity.

The present invention is primarily concerned with the stabilizing, or stabilizing and pigmenting, of those elastomers or crystalline substances of high tensile strength produced by curing polyesters which have achieved an extremely high degree of linear growth, although obviously a useful stabilizing and reinforcing action will also be obtained with substances of a lesser degree of linearity.

With the strictly linear polyesters prepared from glycols and dicarboxylic acids containing no non-benzenoid unsaturation, or from monohydroxy monocarboxylic acids containing no non-benzenoid unsaturation, the degree of linear growth is measured directly by the molecular weight of the polyester, since theoretically each molecule is made up of a single long chain. There is a relatively sharp increase in the tensile strength of the cured polyesters when the molecular weights of the linear polyesters from which they are prepared achieve and exceed values in the vicinity of 8,000 to 10,000, as estimated by the Staudinger viscosity method. Linear polyesters of such molecular weights ordinarily possess intrinsic viscosities in chloroform of at least .4. Linear polyesters will also possess such molecular weights if they contain an average of at least 500 or 600 atoms in their linear chains or if they contain at least 98 ester groups for each 100 total ester, hydroxyl and carboxyl groups in the polyester (98 per cent of theoretical complete esterification).

Polyesters having essentially linear ester chains and formed from reactants, at least one of which contains olefinic unsaturation, will possess these high molecular weights associated with high tensile strength if they contain at least 98 ester groups per 100 total ester, hydroxyl and carboxyl groups in the polyester.

If it is desired to produce the high degree of esterification or condensation indicated above, the reactants from which the polyesters are produced must be subjected to a prolonged heating operation under conditions such as to remove the reaction by-products continuously and effectively as described, for instance, in U. S. Patents 2,071,250 and 2,249,950. The reaction by-products are most effectively removed by bubbling an inert gas such as dry, oxygen-free hydrogen through the reaction mixture until esterification or condensation has proceeded to the desired degree of completion, with or without the application of reduced pressure.

The uncured polyesters may be derived from any glycols and dicarboxylic acids or any monohydroxy monocarboxylic acids which are capable of esterifying to form linear ester chains having lengths of the order desired. Typical saturated glycols and dicarboxylic acids are described in U. S. Patent 2,071,250. Unsaturation may be introduced by substituting an unsaturated dicarboxylic acid such as muconic, maleic, fumaric, itaconic, mesaconic or dihydromuconic acid for a part of the saturated acid. Similarly, a glycol containing olefinic unsaturation may be substituted for a portion or all of the saturated glycol or a hydroxy acid containing olefinic unsaturation may be substituted for all or part of the saturated hydroxy acid.

In order to produce polyesters of the high degree of linear growth referred to above which possess good reversible elasticity when cured, it is necessay to limit the amount of unsaturation present in the reaction mixture so that the resulting theoretical polyester which would be produced if no cross-linking occurred would contain less than about five olefinic bonds per 400 atoms in the linear chain and preferably less than about two such bonds per 400 atoms in the linear chain.

In order to produce cured polyesters which are rubber-like and do not possess crystalline rigidity at room temperatures, it is necessary to prepare the uncured polyesters from reactants which will yield polyesters of a sufficient degree of non-crystallinity to be non-brittle and non-rigid at room temperatures. In producing such non-crystalline polyesters or polyesters of limited crystallinity, advantage is taken of the fact that certain ingredients lead to polyesters which are incapable of crystallization or which have crystalline melting points below room temperatures or which crystallize so slowly that for practical purposes they may be considered permanently non-crystalline.

Polyesters derived by the esterification of polymethylene glycols with polymethylene dicarboxylic acids or by the esterification of polymethylene monohydroxy monocarboxylic acids are, with the exception of those produced from trimethylene glycol and glutaric acid, the most highly crystalline polyesters which have been produced. As the molecular structure departs from this straight chain polymethylene arrangement, as for instance by the introduction of side chain substituents, hetero-atoms or unsaturated carbon-to-carbon bonds, the polyesters become less crystalline. The presence of aromatic rings also in general reduces the crystallinity.

Therefore, polyesters prepared by reacting glycols with dicarboxylic acids, where either one of the constituents has frequently occurring or large side chains, or contains large amounts of non-benzenoid unsaturation or aromatic rings or hetero-atoms in the linear chain, are usually non-crystalline. However, if the other member of the reaction mixture is a polymethylene glycol or a polymethylene dicarboxylic acid, the crystallizing tendencies of the polyester increase as the length of the polymethylene chain increases. Thus dihydromuconic acid forms a non-crystalline polyester with ethylene glycol but a crystalline polyester with decamethylene glycol. Diethylene glycol forms a non-crystalline polyester with succinic acid but a crystalline polyester with sebacic acid.

Among the alkyl substituted polymethylene glycols, the most available is isopropylene glycol or methylethylene glycol. This glycol forms non-crystalline polyesters with polymethylene dicarboxylic acids between succinic acid and sebacic acid. Polyisopropylene succinate does not become excessively crystalline when as much as 50 or 60 per cent of the isopropylene glycol is replaced by ethylene glycol. With isopropylene sebacate, however, no more than about 30 per cent of ethylene glycol can be substituted for the isopropylene glycol without inducing excessive crystallization.

The most available of the non-crystalline polyester forming reactants containing heteroatoms are diethylene glycol and di-isopropylene glycol. Diglycolic acid is also of some interest as a hetero-atom containing compound. The most available of the aromatic ring containing reactants is phthalic acid.

Trimethylene glycol and glutaric acid, both of which contain three methylene groups between their functional end groups, form polyesters, with the shorter chain polymethylene glycol and polymethylene dicarboxylic acids, which crystallize exceedingly slowly and are therefore useful for forming certain of the cured synthetic rubbers which are not rigid at room temperatures.

Another factor influencing crystallinity, aside from the molecular structure of the individual constituents, is the degree of order in the polyester molecules. The most ordered molecules having the most regular polar group spacing, all other factors being equivalent, are the most crystalline. Thus, the greater the number of glycols and the greater the number of dicarboxylic acids or the greater the number of hydroxy acids used in preparing the polyester, the less will be the tendency to crystallize. In a polyester prepared from ethylene glycol and equimolar amounts of sebacic and succinic acids or similar polyesters in which maleic acid is substituted for portions of the succinic acid, the disorder imparts sufficient non-crystallinity to render the cured polyester rubber-like at room temperature.

The non-crystalline or slightly crystalline polyesters are compounded by milling on cold rolls with a curing agent, such as benzoyl peroxide, preferably in the form of a finely divided powder or precipitated upon finely divided calcium carbonate. The stabilizing agent and any other reinforcing pigment which is to be used are then thoroughly milled with the polyester, together with any other compounding ingredients which are to be added. The compounded polyester is then heated in a mold to a temperature sufficient to effect curing of the polyester.

When the polyesters are more highly crystalline milling may be carried on with hot rolls maintained above the crystalline melting point but below the curing temperature. The ingredients may also be mixed in solution, regardless of whether the polyester is normally crystalline or non-crystalline.

The amount of curing agent required to give maximum tensile strength varies with the composition of the polyester, being affected both by the nature of the saturated components and by the amount of unsaturation. When a given polyester is cured with increasing amounts of benzoyl peroxide, the tensile strength rises very sharply, passes through a peak, and then decreases slowly. In saturated polyesters this peak is quite broad, the optimum amounts being from 3 per cent to 6 per cent for sebacate polyesters, and from 5 per cent to 8 per cent for succinate polyesters. As the amount of unsaturation increases the peak becomes much sharper and the actual amount of peroxide required for curing becomes much less. Thus for a sebacate polyester in which 4 mol per cent of the sebacic acid is replaced by maleic acid the optimum amount of peroxide is from .5 per cent to 1 per cent. For a corresponding succinate maleate polyester the optimum amount is from 1 per cent to 2 per cent.

Benzoyl peroxide is the most effective curing agent yet found, but other acyl peroxides, such as lauryl peroxide, are suitable although less effective. Certain other organic peroxides such as certain of the ether peroxides, ketone peroxides, olefin peroxides, terpene peroxides (particularly ascaridol), peracids and hydrocarbon peroxides are sufficiently effective to render them usable for curing the polyesters, particularly those containing unsaturation.

As indicated above, the stability of those polyesters cured with benzoyl peroxide or other acyl peroxides, in the absence of any stabilizing agent, is dependent upon the amount of peroxide used for curing, those polyesters cured with the most peroxide being the least stable. The greatest effect in improving stability by the incorporation of the buffering agents of the present invention is therefore, observed with those polyesters cured with the greatest amount of acyl peroxide.

The amount of buffering agent to be added is governed primarily by the physical effect of the finely divided solid on the properties of the polyester. Ordinarily more than about 1 per cent of the buffering agent by weight of the polyester will be used. With the relatively fine calcium carbonates, and particularly the ultra-fine calcium carbonate referred to above, amounts up to about 100 per cent by weight or more may be used.

When it is desired to take advantage of the outstanding reinforcing action of the ultra-fine calcium carbonates in the cured polyesters which are rubber-like under the conditions of use, this pigment will ordinarily be added in substantial quantities. The reinforcing effect of the pigment is dependent upon the amount of pigment used. Thus a polyester made up of 50 mol per cent ethylene glycol, 5 mol per cent isopropylene glycol, 97 mol per cent succinic acid and 3 mol per cent maleic acid, when cured with 1.5 per cent benzoyl peroxide in the absence of any pigment, had a tensile strength not substantially greater than 100 pounds per square inch. This same rubber reached a maximum tensile strength in the vicinity of 2500 pounds per square inch when between about 50 per cent and about 75 per cent by weight of "Kalvan" was added prior to curing. As the amount of pigment was decreased from these values the tensile strength fell off sharply, having a value of about 1700 pounds per square inch with 25 per cent pigment. Above the optimum pigment content the tensile strength fell off slowly. For other polyester rubbers the optimum percentages for this pigment are substantially the same.

The following specific examples will illustrate the stabilizing action of the buffering agents and the remarkable reinforcing action of the ultra-fine calcium carbonate:

*Example I.*—A mixture of dicarboxylic acids containing 98 mol per cent succinic acid and 3 mol per cent maleic acid and a 25 mol per cent excess of a mixture containing 50 mol per cent isopropylene glycol and 50 mol per cent ethylene glycol, together with a small amount of zinc chloride as a catalyst, were placed in a closed glass reaction vessel maintained at 200° C., and a slow stream of dry, oxygen-free hydrogen was bubbled continuously through the reaction mixture. A packed reflux column maintained at 110° C. was attached to the reaction vessel. After about five hours no more water was evolved, indicating that substantially complete esterification had occurred. The reflux column was then removed and the pressure in the system was reduced to about 6 millimeters of mercury, the temperature being maintained at about 200° C. and the bubbling of hydrogen being continued. Glycol distilled over rapidly and after about 15 minutes an increase in the viscosity of the produce was apparent. At the end of about eight hours the product was removed and found to be an exceedingly viscous, transparent liquid. Two portions of this viscous liquid were milled separately on cold rolls together with about 9 per cent of finely divided benzoyl peroxide. Sixty per cent by weight of Gastex carbon black was then added to each batch of gum on the rolls and the milling was continued until the pigment was well dispersed. In addition, 10 per cent by weight of Atomite (finely divided calcium carbonate) was milled into one batch of gum. Each batch was then cured under pressure for ten minutes in a mold heated to 125° C. in the form of a sheet 50 mils thick. Samples one-quarter inch wide and two inches long cut from the sheets formed from both batches were maintained immersed in separate test tubes in water maintained at 60° C. The samples were tested periodically to determine their rate of deterioration by measuring their elongation under a 500 gram load. After two days, the sample containing no calcium carbonate had deteriorated to the point where the two-inch sample stretched to four inches under the 500 gram load. The sample containing calcium carbonate required seven days of immersion to show the same degree of degradation.

*Example II.*—An uncured polyester was prepared under the conditions described in Example I using a reaction mixture made up of 50 mol per cent sebacic acid, 40 mol per cent isopropylene glycol and 10 mol per cent ethylene glycol. The resulting polyester was milled on cold rolls first with 3 per cent benzoyl peroxide and then with 75 per cent by weight of "Kalvan." The compounded polyester was cured for ten minutes at 125° C. The resulting product had a tensile strength of 3200 pounds per square inch at an elongation of 650 per cent.

Although the invention has been described in terms of its specific embodiments, certain modifications and equivalents will be apparent to those skilled in the art and are intended to be included within the scope of the invention which is to be limited only by the reasonable scope of the appended claims.

What is claimed is:

1. Benzoyl peroxide cured polyisopropylene ethylene sebacate maleate having between 50 per cent and 75 per cent by weight of finely divided, precipitated calcium carbonate having an average particle size of the order of .03 micron or less dispersed therethrough, the isopropylene residue in said polyester constituting at least 80 mol per cent of the combined isopropylene and ethylene residues, the maleate residue constituting about 3 mol per cent of the combined sebacate and maleate residues, said polyester prior to curing having a degree of linear growth indicated by a ratio of ester groups to total ester, hydroxyl and carboxyl groups of at least 98 per cent.

2. Benzoyl peroxide cured polyisopropylene ethylene succinate maleate having between 50 per cent and 75 per cent by weight of finely divided precipitated calcium carbonate which has an average particle size of the order of .03 micron or less dispersed therethrough, the isopropylene residue of said polyester constituting at least 50 mol per cent of the combined isoproylene and ethylene residues, the maleate residue constituting about 3 mol per cent of the combined succinate and maleate residues, said polyesters prior to curing having a degree of linear growth indicated by a ratio of ester groups to total ester, hydroxyl and carboxyl groups of at least 98 per cent.

3. Benzoyl peroxide cured polyisopropylene ethylene sabacate maleate intimately mixed with finely divided calcium carbonate, said polyester prior to curing having a degree of linear growth indicated by a ratio of ester groups to total ester, hydroxyl and carboxyl groups of at least 98 per cent, said polyesters containing less than two olefinic bonds per 400 atoms in the linear ester chains, calculated by assuming no cross-linking between molecules at the unsaturated bonds.

4. Benzoyl peroxide cured polyisopropylene ethylene succinate maleate intimately mixed with finely divided calcium carbonate, said polyester prior to curing having a degree of linear growth indicated by a ratio of ester groups to total ester, hydroxyl and carboxyl groups of at least 98 per cent, said polyesters containing less than two olefinic bonds per 400 atoms in the linear ester chains, calculated by assuming no cross-linking between molecules at the unsaturated bonds.

5. Benzoyl peroxide cured polyisopropylene ethylene sebacate intimately mixed with finely divided calcium carbonate, said polyester prior to curing having a degree of linear growth indicated by a ratio of ester groups to total ester, hydroxyl and carboxyl groups of at least 98 per cent, said polyesters containing less than two olefinic bonds per 400 atoms in the linear ester chains, calculated by assuming no cross-linking between molecules at the unsaturated bonds.

6. A cured elastomer having intimately mixed therewith a finely divided reinforcing and stabilizing pigment in an amount between about 50 per cent and about 75 per cent by weight of the elastomer, said pigment being precipitated calcium carbonate having an average particle size of the order of .3 micron or less, said elastomer being a benzoyl peroxide cured dihydroxyalkane-dicarboxyalkane-dicarboxyolefin polyester, wherein the dicarboxyolefin and dicarboxyalkane are so proportioned that the polyester contains less than five olefinic bonds per 400 atoms in the linear ester chains, calculated by assuming no cross-linking between molecules at the unsaturated bonds, the intramolecular ester chains of said polyester being essentially linear, the number of ester groups in the average molecule of said polyester constituting at least 98 per cent of the total number of ester, hydroxyl and carboxyl groups in said polyester.

7. A cured elastomer having substantially uniformly dispersed therethrough a finely divided reinforcing and stabilizing pigment in an amount between about 50 per cent and about 75 per cent by weight of the elastomer, said pigment being precipitated calcium carbonate having an average particle size of the order of .3 micron or less, said elastomer being an organic peroxide cured dihydroxy aliphatic hydrocarbon-dicarboxy hydrocarbon polyester, said polyester prior to curing containing, as the sole non-benzenoid unsaturation less than five olefinic bonds per 400 atoms in the linear ester chains, calculated by assuming no cross-linking between molecules at the unsaturated bonds, said polyester possessing a sufficient degree of non-crystallinity to permit it to be milled on cold rolls, said polyester having a degree of linear growth indicated by a ratio of ester groups to total ester, hydroxyl and carboxyl groups of at least 98 per cent.

8. A polymer composition comprising finely divided calcium carbonate intimately mixed with a benzoyl peroxide cured polyester made up essentially of divalent hydrocarbon radicals joined by carboxylic ester linkages into essentially linear ester chains, said chains possessing a degree of linear growth as indicated by a ratio of ester groups to total ester, hydroxyl and carboxyl groups of at least 98 per cent, said polyester containing, as the sole non-benzenoid unsaturation, less than five olefinic bonds per 400 atoms in the linear ester chains.

9. A polymer composition comprising a finely divided alkaline earth carbonate intimately mixed with a polymer produced by curing with benzoyl peroxide a fusible polyester, the ester linkages of which are carboxyl ester groups, the ester chains of which are essentially linear, said polyester possessing a degree of linear growth indicated by a ratio of ester groups to total ester, hydroxyl and carboxyl groups of at least 98 per cent, said polyester containing, as the sole non-benzenoid unsaturation, less than five olefinic bonds per 400 atoms in the linear ester chains.

10. A polymer composition comprising a finely divided alkaline carbonate intimately mixed with an acyl peroxide cured polyester the ester linkages of which are carboxylic ester groups, the ester chains of which are essentially linear, said polyester possessing a degree of linear growth indicated by a ratio of ester groups to total ester, hydroxyl and carboxyl groups of at least 98 per cent, said polyester containing, as the sole non-benzenoid unsaturation, less than five olefinic bonds per 400 atoms in the linear ester chains.

BURNARD S. BIGGS.

REFERENCES CITED

The following references are of record in the file of this patent:

UNITED STATES PATENTS

| Number | Name | Date |
|---|---|---|
| 2,195,362 | Ellis | Mar. 26, 1940 |
| 2,255,313 | Ellis | Sept. 9, 1941 |

OTHER REFERENCES

The Valderbilt Rubber Handbook, 1942, pages 178 to 181.